(12) United States Patent
Yoneda

(10) Patent No.: US 6,587,118 B1
(45) Date of Patent: Jul. 1, 2003

(54) IMAGE DISPLAYING PROCESSING METHOD, MEDIUM INCLUDING AN IMAGE DISPLAYING PROCESSING PROGRAM STORED THEREON, AND IMAGE DISPLAYING PROCESSING APPARATUS

(75) Inventor: Michiaki Yoneda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/534,941

(22) Filed: Mar. 24, 2000

(30) Foreign Application Priority Data

Mar. 31, 1999 (JP) .......................................... 11-092860

(51) Int. Cl.⁷ ................................................ G09G 5/00
(52) U.S. Cl. ...................................... 345/629; 345/764
(58) Field of Search ................................ 345/629, 634, 345/636, 637, 764

(56) References Cited

U.S. PATENT DOCUMENTS

| | | | | |
|---|---|---|---|---|
| 5,283,560 A | * | 2/1994 | Bartlett | 345/729 |
| 5,745,095 A | * | 4/1998 | Parchem et al. | 345/545 |
| 5,778,377 A | * | 7/1998 | Marlin et al. | 707/103 R |
| 5,880,740 A | * | 3/1999 | Halliday et al. | 345/629 |
| 5,883,627 A | * | 3/1999 | Pleyer | 345/629 |
| 6,111,614 A | * | 8/2000 | Mugura et al. | 345/592 |
| 6,118,427 A | * | 9/2000 | Buxton et al. | 345/629 |
| 6,259,457 B1 | * | 7/2001 | Davies et al. | 345/629 |
| 6,295,061 B1 | * | 9/2001 | Park et al. | 345/764 |
| 6,313,854 B1 | * | 11/2001 | Gibson | 345/746 |
| 6,317,128 B1 | * | 11/2001 | Harrison et al. | 345/629 |
| 6,456,892 B1 | * | 9/2002 | Dara-Abrams et al. | 700/83 |
| 6,460,040 B1 | * | 10/2002 | Burns | 707/10 |

* cited by examiner

*Primary Examiner*—Michael Razavi
*Assistant Examiner*—Ryan Yang
(74) *Attorney, Agent, or Firm*—Oblon, Spivak, McClelland, Maier & Neustadt, P.C.

(57) ABSTRACT

An image displaying processing method, a medium including an image displaying processing program stored thereon, and an image displaying processing apparatus are disclosed which allow a menu bar or the like to be displayed in a semi-transparent fashion such that an image and/or a character in an underlying layer can be seen through the menu. A client computer acquires first visual information and second visual information with a particular degree of transparency from a desired server via a network. The picture elements of the acquired first and second visual information are displayed in the first and second layers, respectively, in such a manner that an image is synthesized by superimposing the picture elements of the first and second visual information at overlapping locations in the first and second layers according to a predetermined superimposing method and the resultant image is displayed thereby allowing a user to click a particular part of the visual information in the second layer while viewing the visual information in the first layer under the second layer.

5 Claims, 5 Drawing Sheets

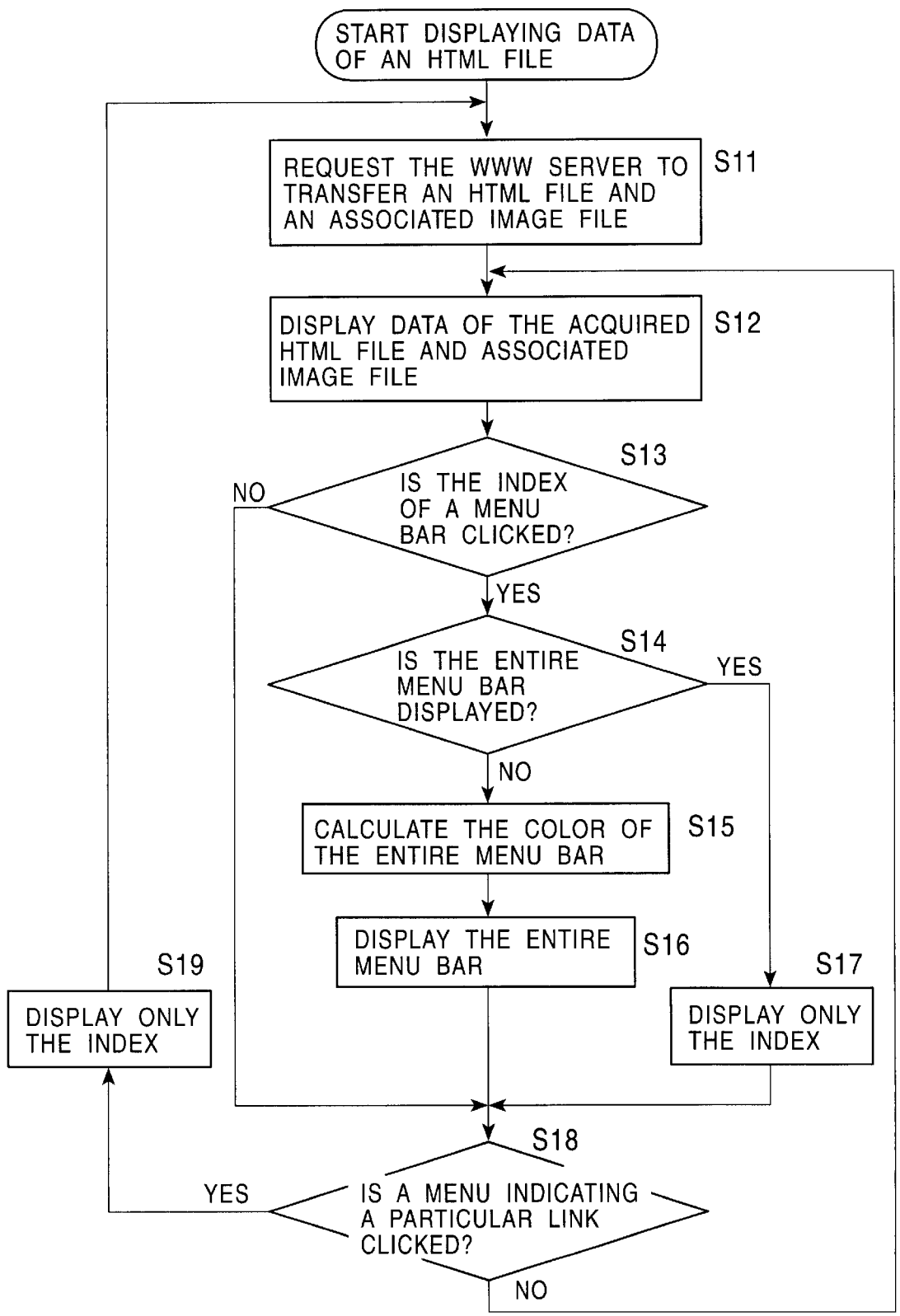

IMAGE DISPLAYING PROCESSING METHOD, MEDIUM INCLUDING AN IMAGE DISPLAYING PROCESSING PROGRAM STORED THEREON, AND IMAGE DISPLAYING PROCESSING APPARATUS

BACKGROUND OF THE INVENTION

1. Field of the Invention

The present invention relates to an image displaying processing method, a medium including an image displaying processing program stored thereon, and an image displaying processing apparatus, which are particularly advantageous when applied to a WWW browser for displaying visual information such as a character and an image described in an HTML (Hyper Text Markup Language) file supplied from a WWW (World Wide Web) server or the like.

2. Description of the Related Art

It has become very popular to read visual information such as a character and an image supplied from various WWW servers via the Internet, using a WWW (World Wide Web) browser running on a personal computer.

To read such visual information, a user operates a personal computer on which a WWW browser is running so as to request a desired WWW server to transmit a desired file in the HTML (Hyper Text Markup Language) format (hereinafter referred to as an HTML file) and an image file associated with that HTML file via the Internet.

Upon reception of the request from the personal computer, the WWW server transmits the requested HTML file and the associated image file via the Internet to the personal computer which has issued the request.

If the personal computer receives the HTML file and the associated image file, the personal computer displays character information contained in the HTML file and associated image information on the WWW browser running on that personal computer.

HTML files have the capability of specifying layers in which respective images and/or characters are placed. Images and/or characters placed in respective layers are superimposed in a specified order into a single image, and the resultant superimposed image is displayed.

Some Web browsers have the capability of modifying information such as an image displayed thereon in response to an operation performed by a user of a personal computer. For example, a menu bar may be displayed in such a manner that it is overwritten in a higher layer above a layer in which a current page is displayed.

More specifically, when a WWW browser receives a dynamic HTML file, the WWW browser first displays only the index 70*i* of a menu bar 70 on the display screen 69, as shown in FIG. 5A. If the index 70*i* is clicked, the WWW browser expands the menu bar 70 displayed on an end of the display screen 69 and displays the whole of the menu bar 70 as shown in FIG. 5B.

A menu 71 including a character string "Menu1 (URL1)" and a menu 72 including a character string "Menu2 (URL2)" are displayed on the menu bar 70, wherein the menus 71 and 72 are linked to particular URL addresses URL1 and URL2, respectively. When the menu bar 70 is entirely displayed, if the character string of the menu 71 is clicked with a mouse, a linked page specified by URL1 is displayed, and the menu bar 70 returns to the minimum size in which only the index 70*i* is displayed as in FIG. 5A. In the case where the index 70*i* is clicked when the entire menu bar 70 is displayed, the menu bar 70 also returns to the minimum size as in FIG. 5A.

The dynamic HTML is widely used in the art to describe a menu bar or the like such that it can be dynamically moved.

However, when the menu bar 70 is expanded to its full size, an image or character (in a page being displayed) in an underlying layer is entirely hidden by the menu bar 70. This makes it impossible for a user to refer to the image or character in the underlying layer when the user clicks the menu 71 or 72 on the menu bar 70.

In view of the above, it is an object of the present invention to provide a technique of displaying an image and/or a character, such as a menu bar, in such a manner that another image and/or character in a lower layer can be seen through the menu bar.

SUMMARY OF THE INVENTION

According to a first aspect of the present invention, there is provided an image displaying processing method comprising: an information acquiring step for acquiring first visual information and second visual information having predetermined transparency from a predetermined server via a network; a first-layer displaying step for displaying a picture element of the first visual information acquired in the information acquiring step, in a first layer on a display screen; a second-layer displaying step for displaying a picture element of the second visual information acquired in the information acquiring step, in a second layer above the first layer on the display screen; and an image superimposing step for superimposing the picture elements of the first and second visual information to be displayed at an overlapping location in the first and second layers, respectively, in accordance with a predetermined superimposing method and displaying the resultant superimposed image on the display screen.

According to another aspect of the present invention, there is provided a medium including an image displaying processing program stored thereon, the program including: an information acquiring step for acquiring first visual information and second visual information having predetermined transparency from a predetermined server via a network; a first-layer displaying step for displaying a picture element of the first visual information acquired in the information acquiring step, in a first layer; a second-layer displaying step for displaying a picture element of the second visual information acquired in the information acquiring step, in a second layer above the first layer; and an image superimposing step for superimposing the picture elements of the first and second visual information to be displayed at an overlapping location in the first and second layers, respectively, in accordance with a predetermined superimposing method and displaying the resultant superimposed image on the display screen.

According to still another aspect of the present invention, there is provided an image displaying processing apparatus comprising: information acquiring means for acquiring first visual information and second visual information having predetermined transparency from a predetermined server via a network; first-layer displaying means for displaying a picture element of the first visual information acquired by the information acquiring means, in a first layer; second-layer displaying means for displaying a picture element of the second visual information acquired by the information acquiring means, in a second layer above the first layer; and image superimposing means for superimposing the picture elements of the first and second visual information to be displayed at an overlapping location in the first and second layers, respectively, in accordance with a predetermined superimposing method and displaying the resultant superimposed image.

In the image displaying processing method, the medium including the image displaying processing program stored thereon, and the image displaying processing apparatus according to the present invention, the first visual information and the second visual information with a particular degree of transparency are acquired from a desired server via a network, picture elements of the acquired first visual information are displayed in the first layer, and picture elements of the acquired second visual information are displayed in the second layer in such a manner that an image is synthesized by superimposing the picture elements of the first and second visual information at overlapping locations in the first and second layers, and the resultant image is displayed.

BRIEF DESCRIPTION OF THE DRAWINGS

FIG. 4 is a flow chart illustrating the process performed by a client personal computer to display data such as an HTML file;

DESCRIPTION OF THE PREFERRED EMBODIMENTS

Figure 1:
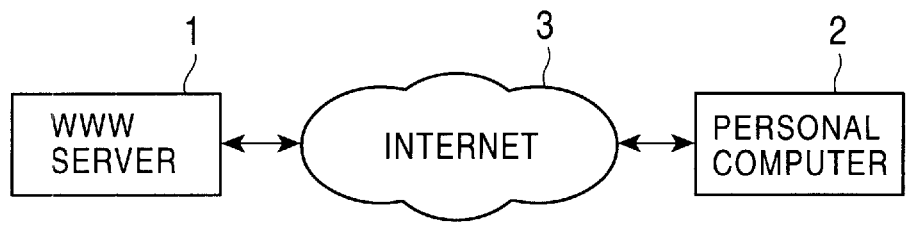
FIG. 1 is a schematic diagram illustrating an embodiment of a client server system according to the present invention.

FIG. 1 is a schematic diagram illustrating an embodiment of a client server system according to the present invention.

A WWW server 1 and a client personal computer 2 are connected to each other via the Internet 3.

The personal computer 2 on which a WWW browser is running is operated to request the WWW server 1 to transmit a particular HTML file and an image file associated with that HTML file via the Internet 3.

Upon receiving the request from the personal computer 2, the WWW server 1 transfers the requested HTML file and associated image file via the Internet 3 to the personal computer 2 which has issued the request.

The personal computer 2 displays a home page including a character and an image on the basis of the HTML file and the associated image file acquired from the WWW server 1 using the accessing capability of the WWW browser.

Figure 2:
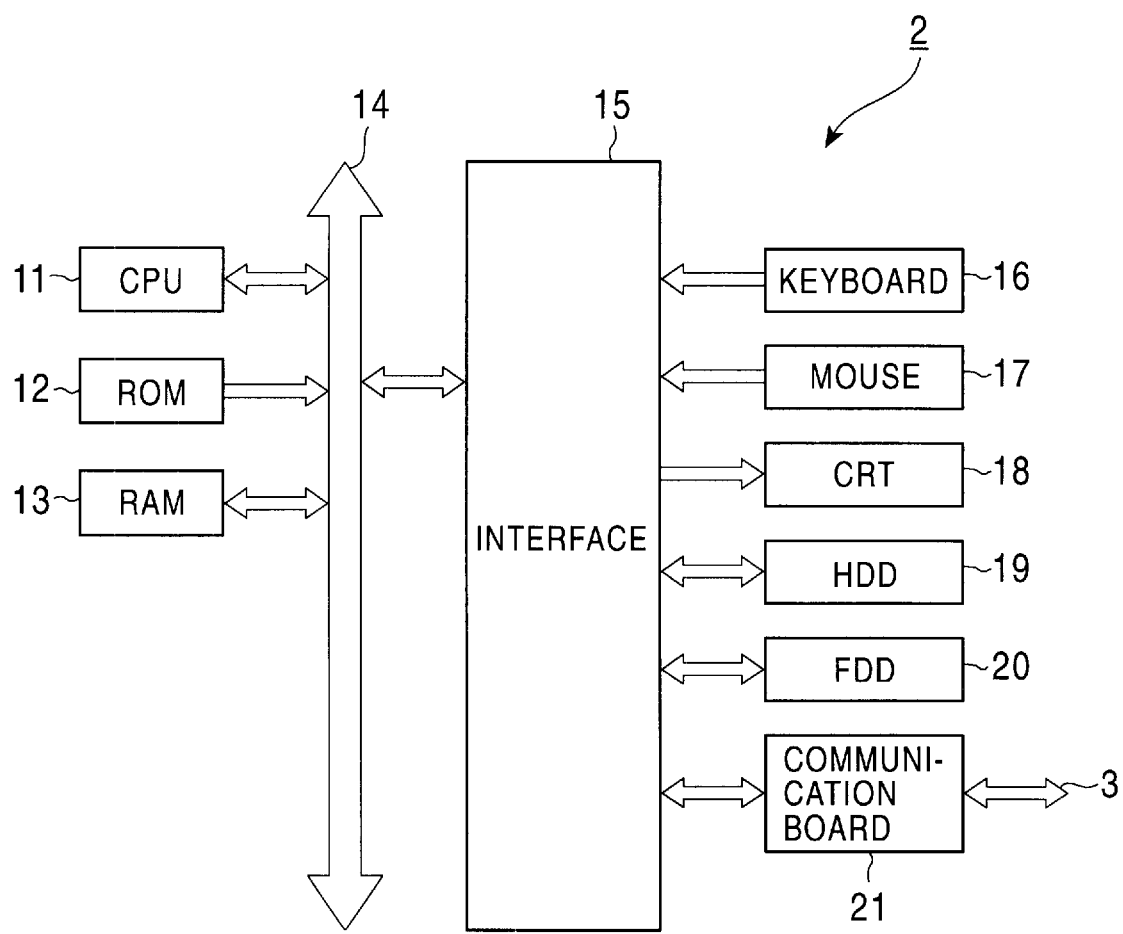
FIG. 2 is a block diagram illustrating the configuration of a client personal computer.

FIG. 2 is a block diagram illustrating the configuration of the personal computer 2. A CPU (central processing unit) 11 executes various application programs such as a WWW browser and a basic OS (operating system). A ROM (read only-memory) 12 stores fixed basic data such as a BIOS program and parameters used by the CPU 11 in operations. A RAM (random access memory) 13 is used to store a program executed by the CPU 11 and also a parameter which varies during the execution of the program. These parts are connected to the CPU 11 via a bus 14.

A keyboard 16 is used by a user to input various command to the CPU 11. A mouse 17 is used by the user to point to a point on the screen of a CRT (cathode ray tube) 18 and select it. The CRT displays various information in the form of a text or an image. An HDD (hard disk drive) 19 and an FDD (floppy disk drive) 20 drive a hard disk and a floppy disk, respectively, serving as storage media so as to read an application program such as a WWW browser and various data in response to a request issued by the CPU 11.

A communication board 21 is a device for connection with the Internet 3. Specific examples of the communication board 21 are an Ethernet board mainly used in companies and a modem generally used in home for connection with an Internet provider.

The above-described parts from the keyboard 16 to the communication boards 21 are connected to an interface 15. The interface 15 is connected to the CPU 11 via the bus 14.

Figure 3A:
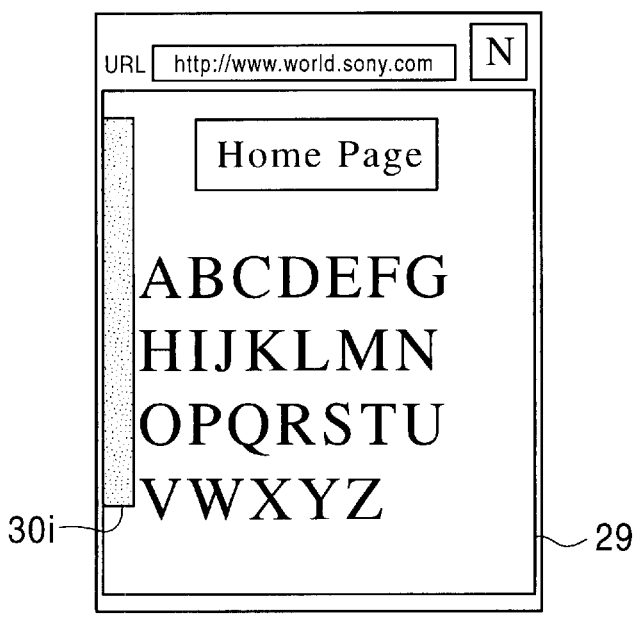
FIGS. 3A, 3B and 3C illustrate examples of manners in which a menu bar of an HTML file received from a WWW server is displayed on a display screen of a client personal computer.
Figure 3B:
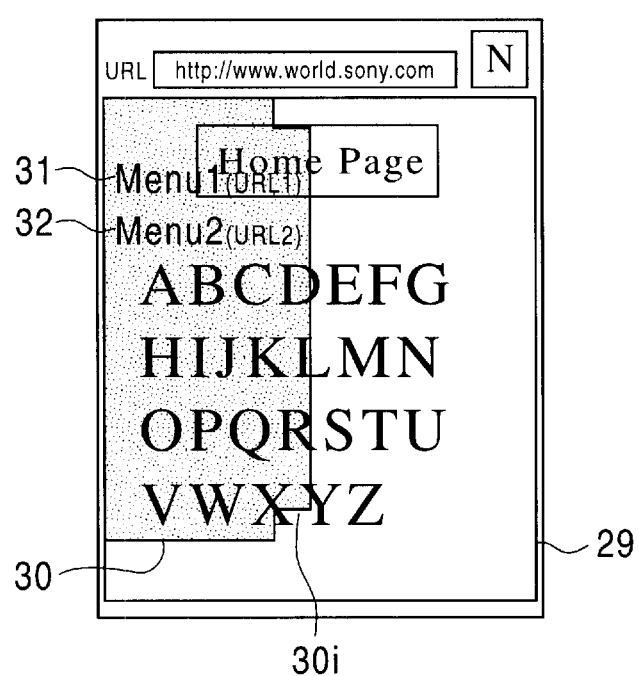
Figure 3C:
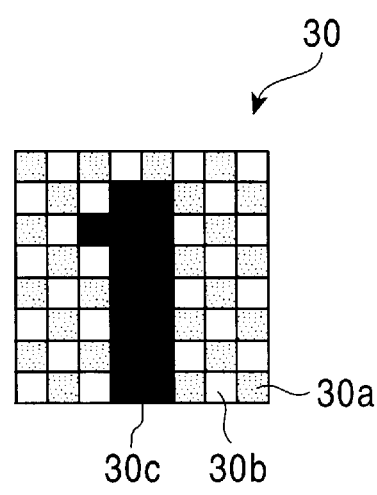
Figure 5A:
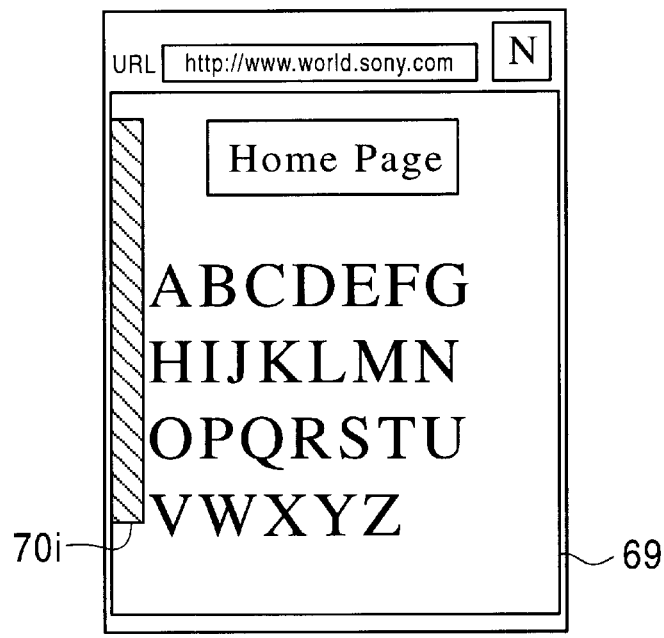
FIGS. 5A and 5B illustrate examples of conventional manners in which a menu bar is displayed on a display screen of a client personal computer.
Figure 5B:
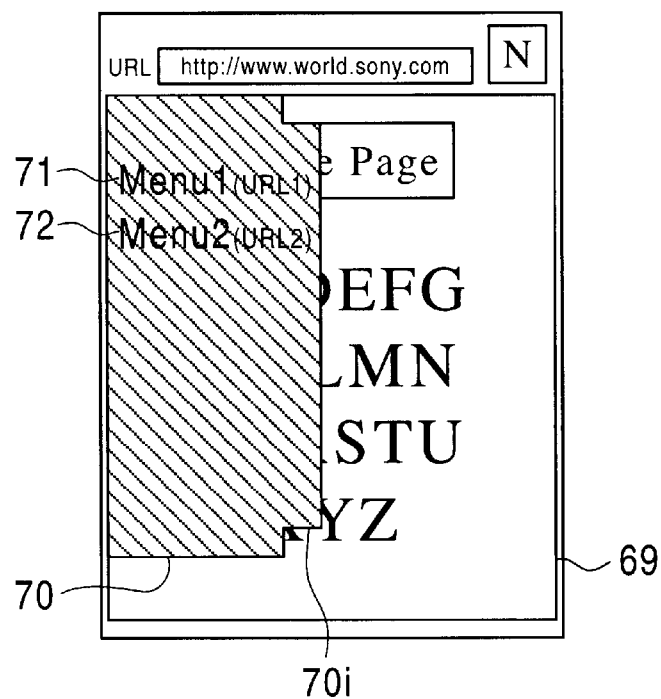

FIGS. 3A, 3B, and 3C illustrate examples of manners in which an HTML file acquired from the WWW server 1 is displayed on the display screen 29 such that a text (ABCDEFG . . . XYZ) of a home page and a menu bar 30 are superimposed. In FIG. 3A, the menu bar 30 is displayed in such a manner that only its index 30i is displayed.

In the example shown in FIG. 3B, the menu bar 30 is displayed in a semi-transparent fashion on the personal computer 2 according to the present invention so that the text (ABCDEFG . . . XYZ) in the lower layer can be seen through the menu bar 30.

One technique of displaying the menu bar 30 in a semi-transparent fashion is to describe image data according to the transparent GIF (graphic interchange format) format.

Another technique is to define a transparency property indicating the degree of transparency of an image in a particular layer.

First, the technique of displaying the menu bar 30 in a virtually transparent fashion by describing the image according to the transparent GIF format is described below.

The GIF is an image file format developed by Compuserve, one of major personal computer communication companies, and the GIF format is now widely used to represent a WWW image. The GIF format is capable of describing a monochromatic image and also a color image with up to 256 colors. Because of its high compression efficiency, the GIF is widely used as the standard format as well as the JPEG format in the Internet.

In addition to the standard GIF format, the GIF formats also include an interlaced GIF format in which data of the entire part of image is gradually read rather than being read on a part-by-part basis; a GIF animation format which allows an image to be moved but in a rather discontinuous manner; and a transparent GIF format which allows a specified background image with a particular color to be displayed in a semi-transparent fashion. These FIG formats are defined in GIF89a issued in 1989.

Although other many file formats such as the TIFF are based on random accessing, the GIF format is based on sequential accessing because it was originally designed for transmission of a data stream. Each block of data has a tag indicating the content thereof. Most Web document applications and image processing applications have a capability of handing an image in the GIF format.

The transparent GIF is one of GIF formats described above. The transparent GIF allows a background image with a particular color to be set to be transparent so that another image in an underlying layer can be seen through the background image. If a rectangular image according to the standard GIF format is embedded into a particular area of a Web document, the area of the Web document is entirely hidden by the rectangular image. In contrast, if the rectangular image is described according to the transparent GIF format and if a particular color of the background of the rectangular image is set to be transparent, the background image is removed and the remaining part is embedded in the Web document.

FIG. 3C illustrates a part of the image shown in FIG. 3B in an enlarged fashion so that the array of picture elements can be seen. As can be seen from FIG. 3B, the menu bar 30 is composed of non-transparent picture elements 30a representing a color of the menu bar 30 and transparent picture elements 30b through which the lower layer can be seen, wherein those picture elements 30a and 30b are disposed in an array form like a chessboard according to the transparent GIF format.

In the image according to the transparent GIF format, non-transparent picture elements 30a representing the color of the menu bar 30 and transparent picture elements 30b are alternately placed.

The lower layer can be seen through the transparent picture elements 30b which are represented by open squares in FIG. 3C. The non-transparent picture elements 30a, which are represented by means of shading with a gray color in FIG. 3C, are set to picture element values (RGB levels) so as to represent the menu bar 30.

In FIG. 3C, picture elements 30c filled with black represents a part of the character string "Menu1(URL1)" displayed on the menu bar 30.

Herein, a menu 31 including the character string "Menu1 (URL1)" and a menu 32 including a character string "Menu2 (URL2) displayed on the menu bar 30 are linked to particular URL addresses URL1 and URL2, respectively.

Picture elements are disposed such that picture elements located at adjacent right, left, upper, and lower sides of each transparent picture element 30b are picture elements 30a representing the menu bar and such that picture elements located at adjacent right, left, upper, and lower sides of each picture element 30a representing the menu bar are transparent picture elements 30b.

If the menu bar 30 composed of transparent picture elements 30b and non-transparent picture elements 30a representing the color of the menu bar 30 are displayed in the upper layer in a virtually semi-transparent fashion according to the GIF format described above, the menu bar 30 and the text and the image of the home page displayed in the lower layer can be seen as shown in FIG. 3B.

The second method of defining, in a new tag of an HTML file, the transparency attribute representing the degree of transparency of an image in a particular layer is now described below.

In this method, when the personal computer 2 displays the menu bar 30, the values of picture elements of the menu bar 30 having a particular color (picture element values) defined in an HTML file are mixed with the values of picture elements of a text and/or an image in the lower layer under the menu bar 30 thereby synthesizing picture elements with a mixed color (picture elements values).

To describe the menu bar 30 in the above fashion, a transparency attribute representing the degree of transparency of an image in a particular layer may be described in a tag of an HTML file.

Corresponding to a conventional format of describing a tag such as:

<Layertop="width=?"height=?"name=layer">, a tag representing the degree of transparency of the layer is described as follows:
<LAYERtransparency=?%>

Herein, the value representing the transparency can be set to an arbitrary value within the range from 0% to 100% in steps of 1%.

In accordance with the value representing the transparency attribute, the WWW browser generates picture element values by mixing the values of picture elements in the lower layer and the values of the corresponding picture elements in the upper layer on an element-by-element basis. The WWW browser then displays the resultant picture elements having the mixed values on the CRT 18 of the personal computer 2.

For example, when the transparency is 50%, if a picture element in the lower layer has picture element values R:G:B=126:36:78, and if a picture element of the semi-transparent menu bar has picture element values R:G:B= 2:146:52, then the mixed values of that picture element can be calculated as R:G:B=64:91:65, as described below.

$R$: 126*0.5+2*0.5=63+1=64

$G$: 36*0.5+146*0.5=18+73=91

$B$* 78*0.5+52*0.5=39+26=65

Herein, the lower limits of R, G, and B values are 0, and the upper limits are 255.

The transparency attribute may also be described in JavaScript so as to dynamically control an HTML file.

Corresponding to a conventional JavaScript description of the attribute of the name of a layer such as:

document.layer[*].name="upperlayer", the degree of transparency can be described as follows:
document.layer[*].transparency=?%

Furthermore, corresponding to a conventional JavaScript description for acquiring the value of the name of a layer such as:

name=document.layer[*].name,
acquiring of the degree of transparency can be described as follows:

trans=document.layer[*].transparency

When an HTML file including the menu bar 30 is given, if the personal computer 2 displays the semi-transparent menu bar 30 on an image and/or a character according to the transparency defined in the HTML file, then a user of the personal computer 2 can see the text and/or the image in the lower layer under the semi-transparent menu bar 30.

The operation of the personal computer 2 to display an HTML file on a WWW browser is described below with reference to the flow chart shown in FIG. 4.

In step S11, the CPU 11 of the personal computer 2 transmits a message to the WWW server 1 via the communication board 21 and the Internet 3 to request a desired HTML file and an image file associated with the HTML file to be transferred.

In step S12, the CPU 11 of the personal computer 2 acquires the HTML file and the associated image file from the WWW server 1 via the Internet 3 and displays them on the CRT 18 as shown in FIG. 3A.

In step S13, the CPU 11 of the personal computer 2 determine whether or not the index 30i of the menu bar 30 displayed on the CRT 18 is clicked with the mouse 17. If it is determined that the index 30i displayed on the CRT 18 is clicked, the process goes to step S14 to further determine whether or not the menu bar 30 is entirely displayed.

If it is determined in step S14 that the menu bar 30 is not entirely displayed, the process goes to step S15. In step S15, the CPU 11 of the personal computer 2 synthesizes picture elements having mixed picture element values calculated on the basis of the picture element values of the picture elements of the menu bar 30 and the picture element values of the picture elements of the text and/or the image in the lower layer, at locations corresponding to the picture elements of the menu bar 30 thereby representing the picture elements of the menu bar 30 with mixed values.

This step S15 is not necessary if the menu bar 30 is displayed in a virtually semi-transparent fashion according to the transparent GIF format.

In step S16, the CPU 11 of the personal computer 2 in accordance with the picture element values of the picture elements of the menu bar 30 synthesized in step S15 expands the menu bar 30 displayed on the left end of the display screen of the CRT 18 toward the right and displays the expanded menu bar 30 as shown in FIG. 3B. Thereafter the process goes to step S18.

In the case where it is determined in step S14 that the menu bar 30 is entirely displayed, the process goes to step S17. In step S17, the CPU 11 of the personal computer 2 reduces the size of the menu bar 30 so that it is displayed on the left end of the display screen 29 of the CRT 18, that is, only the index 30i of the menu bar 30 is displayed on the CRT 18 as shown in FIG. 3A. Thereafter, the process goes to step S18.

In the case where it is determined in step S13 that the index 30i of the menu bar 30 displayed on the CRT 18 is not clicked, it is not required to modify the menu bar 30, and thus the process goes to step S18.

In step S18, the CPU 11 of the personal computer 2 determines whether or nor a menu 31 including a character string "Menu1(URL1)" or a menu 32 including a character string "Menu2(URL2)" on the menu bar 30 displayed on the CRT 18 is clicked with the mouse 17, wherein the menus 31 and 32 are linked to particular HTML files, respectively. If it is determined that either the menu 31 or 32 on the menu bar 30 is clicked, it is determined that another page is requested to be displayed, and thus the process goes to step S19. In step S19, the CPU 11 of the personal computer 2 reduces the size of the menu bar 30 toward the left end of the display screen 29 of the CRT 18 so that only the index 30i is displayed. Thereafter, the process returns to step S11 and repeats the above steps from the step in which transmission of a desired HTML file is requested.

In the case where it is determined in step S18 that neither the menu 31 nor 32 on the menu bar 30 is clicked, it is not required to display another page, and thus the process returns to step S12 to repeatedly display the current HTML file.

When the operation of the WWW browser is terminated, the above process is completed.

As described above, the client personal computer 2 displays the semi-transparent menu bar 30 on the WWW browser, a user can click the menu 31 or 32 displayed on the menu bar 30 to indicate a linked page, using the mouse 17 while viewing a text or an image displayed on a page.

Figure 6A:
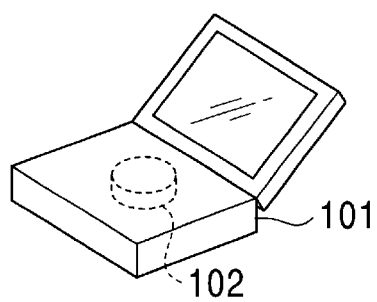
FIGS. 6A, 6B and 6C are schematic diagram illustrating various media.
Figure 6B:
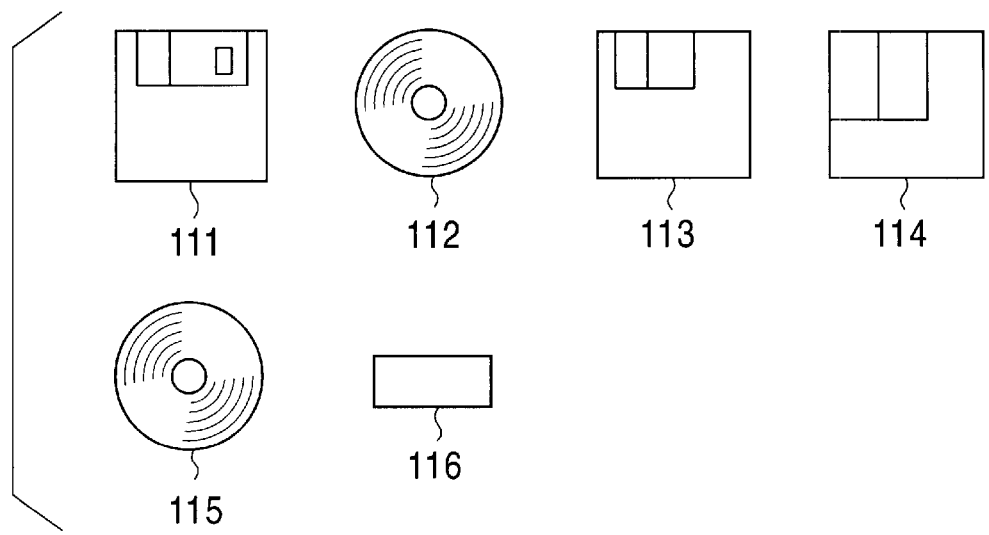
Figure 6C:
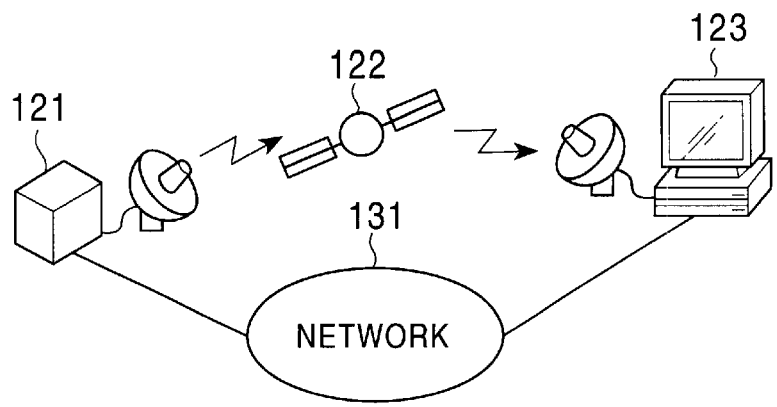

Now referring to FIG. 6, there is described a medium used to install an image displaying processing program such as a WWW browser so that the process including the steps described above can be executed on a computer.

One method of providing the image displaying processing program such as a WWW browser to a user is to install it in advance on a hard disk 102 (corresponding to the hard disk located inside the hard disk drive 19 shown in FIG. 2) serving as a storage medium disposed inside a personal computer 101, as shown in FIG. 6A.

Alternatively, the image displaying processing program such as a WWW browser may be provided in the form of package software stored, temporarily or permanently, on a storage medium such as a floppy disk 11, a CD-ROM 112, an MO disk, 113, a DVD 114, a magnetic disk 115, or a semiconductor memory 116, as shown in FIG. 6B.

The image displaying processing program such as a WWW browser may also be transferred to a personal computer 123 from a downloading cite 121 by means of radio communication via a satellite 122, or by means of wire or wireless communication via a network 131 such as a local area internet or the Internet, thereby downloading the image displaying processing program onto a hard disk disposed in the personal computer 123.

In the present invention, the term "medium" is used in a broad sense to describe all those types of media.

Furthermore, in the present invention, steps of the program supplied via a medium may be executed either in a serial fashion or in a parallel fashion with respect to time, or may be executed separately.

Furthermore, in the present invention, the term "system" is used to describe the entire system including a plurality of apparatus.

As can be seen from the above description, the present invention has an advantage. That is, in the image displaying processing method, the medium including the image displaying processing program stored thereon, and the image displaying processing apparatus according to the present invention, the first visual information and the second visual information with a particular degree of transparency are acquired from a desired server via a network, picture elements of the acquired first visual information are displayed in the first layer, and picture elements of the acquired second visual information are displayed in the second layer in such a manner that an image is synthesized by superimposing the picture elements of the first and second visual information at overlapping locations in the first and second layers, and the resultant image is displayed thereby allowing a part of the visual information in the first layer to be seen through the visual information in the second layer located above the first layer without being entirely hidden by the visual information in the first layer, and thus allowing a user to click a particular part of the visual information in the second layer while viewing the visual information in the first layer under the second layer.

What is claimed is:

1. An image displaying processing method comprising:
   an information acquiring step for acquiring first visual information and second visual information having predetermined transparency from a predetermined server via a network;
   a first-layer displaying step for displaying a picture element of the first visual information acquired in said information acquiring step, in a first layer on a display screen, said first visual information displayed being a document described in the HTML (Hyper Text Markup Language);
   a second-layer displaying step for placing a picture element of the second visual information acquired in said information acquiring step, in a second layer above said first layer on the display screen, said second visual information being an image having a chessboard-like shape according to the transparent GIF (Graphic Interchange Format) format; and
   an image superimposing step for superimposing the picture elements of said first and second visual information to be displayed at an overlapping location in said first and second layers, respectively, in accordance with a predetermined superimposing method and displaying the resultant superimposed image on the display screen, said superimposing method alternately placing, on the display screen, the picture elements of said first and second visual information to be displayed at an overlapping location in said first and second layers, respectively, thereby virtually superimposing said first and second visual information and displaying the virtually superimposed image on the display screen and said superimposing method placing the image according to the transparent GIF format as the second visual information in the second layer above the first layer in which the document is placed as the first visual information so that said first and second visual information are virtually superimposed and the resultant superimposed information is displayed on said display screen, wherein said image superimposing step displays a menu bar as said second visual information in such a manner that when said menu is expanded from an end of the display screen in response to a selection of a menu, the expanded menu bar is displayed according to the transparent GIF format.

2. An image displaying processing method comprising:

an information acquiring step for acquiring first visual information and second visual information having predetermined transparency from a predetermined server via a network;

a first-layer displaying step for displaying a picture element of the first visual information acquired in said information acquiring step, in a first layer on a display screen, said first visual information displayed being a document described in the HTML (Hyper Text Markup Language);

a second-layer displaying step for placing a picture element of the second visual information acquired in said information acquiring step, in a second layer above said first layer on the display screen, said second visual information being an image having a chessboard-like shape according to the transparent GIF (Graphic Interchange Format) format; and an image superimposing step for superimposing the picture elements of said first and second visual information to be displayed at an overlapping location in said first and second layers, respectively, in accordance with a predetermined superimposing method and displaying the resultant superimposed image on the display screen, said superimposing method alternately placing, on the display screen, the picture elements of said first and second visual information to be displayed at an overlapping location in said first and second layers, respectively, thereby virtually superimposing said first and second visual information and displaying the virtually superimposed image on the display screen and said superimposing method placing the image according to the transparent GIF format as the second visual information in the second layer above the first layer in which the document is placed as the first visual information so that said first and second visual information are virtually superimposed and the resultant superimposed information is displayed on said display screen, wherein said image superimposing step displays a menu bar as said second visual information in such a manner that when said menu is expanded from an end of the display screen in response to a selection of a menu, the expanded menu bar is displayed according to the transparent GIF format, and link information indicating a particular linked page is described in the image of the menu bar according to the transparent GIF format, and said image superimposing step displays said menu bar in the form expanded from the end of the display screen such that a part of said first visual information is seen through said menu bar and such that said linked page can be selected.

3. An image displaying processing method comprising:

an information acquiring step for acquiring first visual information and second visual information having predetermined transparency from a predetermined server via a network;

a first-layer displaying step for displaying a picture element of the first visual information acquired in said information acquiring step, in a first layer on a display screen;

a second-layer displaying step for placing a picture element of the second visual information acquired in said information acquiring step, in a second layer above said first layer on the display screen; and an image superimposing step for superimposing the picture elements of said first and second visual information to be displayed at an overlapping location in said first and second layers, respectively, in accordance with a predetermined superimposing method and displaying the resultant superimposed image on the display screen wherein said image superimposing step superimposes said first and second visual information in a ratio corresponding to the degree of transparency of the second visual information, in accordance with the picture element values of picture elements of said first and second visual information to be displayed at a superimposed location in said first and second layers, respectively, and displays the resultant superimposed visual information on the display screen and a degree of transparency of said second visual information is described in a tag of an HTML file, and said image superimposing step superimposes said first and second visual information in accordance with the degree of transparency of said second visual information described in said tag and displays the resultant superimposed information on the display screen.

4. A medium including an image displaying processing program stored thereon, said program including:

an information acquiring step for acquiring first visual information and second visual information having predetermined transparency from a predetermined server via a network;

a first-layer displaying step for displaying a picture element of the first visual information acquired in said information acquiring step, in a first layer said first visual information displayed in said first-layer displaying step is a document described in the HTML (Hyper Text Markup Language);

a second-layer displaying step for displaying a picture element of the second visual information acquired in said information acquiring step, in a second layer above said first layer said second visual information processed in said second-layer displaying step is an image according to the transparent GIF (Graphic Interchange Format) format; and an image superimposing step for superimposing the picture elements of said first and second visual information to be displayed at an overlapping location in said first and second layers, respectively, in accordance with a predetermined superimposing method and displaying the resultant superimposed image, said image superimposing step places the image according to the transparent GIF format as the second visual information in the second layer above the first layer in which the document is placed as the first visual information so that said first and second visual information are virtually superimposed and the resultant superimposed information is displayed.

5. An image displaying processing apparatus comprising:

information acquiring means for acquiring first visual information and second visual information having predetermined transparency from a predetermined server via a network;

first-layer displaying means for placing a picture element of the first visual information acquired by said information acquiring means, in a first layer, said first visual information displayed by said first-layer displaying means is a document described in the HTML (Hyper Text Markup Language);

a second-layer displaying means for displaying a picture element of the second visual information acquired by said information acquiring means, in a second layer above said first layer said second visual information processed by said second-layer displaying processing means is an image according to the transparent GIF (Graphic Interchange Format) format; and image superimposing means for superimposing the picture elements of said first and second visual information to be displayed at an overlapping location in said first and second layers, respectively, in accordance with a predetermined superimposing method and displaying the resultant superimposed image, said image superimposing means places the image according to the transparent GIF format as the second visual information in the second layer above the first layer in which the document is placed as the first visual information so that said first and second visual information are virtually superimposed and the resultant superimposed information is displayed.

* * * * *

UNITED STATES PATENT AND TRADEMARK OFFICE
CERTIFICATE OF CORRECTION

PATENT NO.   : 6,587,118 B1
DATED        : July 1, 2003
INVENTOR(S)  : Michiaki Yoneda It is certified that error appears in the above-identified patent and that said Letters Patent is hereby corrected as shown below:

<u>Column 3,</u>
Line 36, change "diagram" to -- diagrams --.

<u>Column 4,</u>
Line 63, change "handing" to -- handling --.

<u>Column 10,</u>
Line 38, change "IITML" to -- HTML --.

Signed and Sealed this

Twenty-fourth Day of February, 2004

JON W. DUDAS
*Acting Director of the United States Patent and Trademark Office*